US007576448B2

(12) United States Patent
Goodrich

(10) Patent No.: US 7,576,448 B2
(45) Date of Patent: Aug. 18, 2009

(54) SWITCHED OUTLET MODULE AND METHOD THEREFOR

(75) Inventor: Patrick D. Goodrich, Phoenix, AZ (US)

(73) Assignee: luxive lc, Phoenix, AZ (US)

( * ) Notice: Subject to any disclaimer, the term of this patent is extended or adjusted under 35 U.S.C. 154(b) by 346 days.

(21) Appl. No.: 11/279,787

(22) Filed: Apr. 14, 2006

(65) Prior Publication Data

US 2007/0241615 A1 Oct. 18, 2007

(51) Int. Cl.
*H02J 3/00* (2006.01)
*H02J 3/14* (2006.01)
*H01H 47/00* (2006.01)

(52) U.S. Cl. ........................................ 307/31; 307/140

(58) Field of Classification Search .................. 307/31, 307/140

See application file for complete search history.

(56) References Cited

U.S. PATENT DOCUMENTS

2005/0012401 A1* 1/2005 Goodrich .................... 307/140

* cited by examiner

*Primary Examiner*—Fritz M Fleming
*Assistant Examiner*—Dru M Parries
(74) *Attorney, Agent, or Firm*—Jeffrey D. Moy; Weiss & Moy, P.C.

(57) ABSTRACT

A switched outlet module which controls power to one or more electrically powered devices which are connected to the module and which are under the control of a wall switch has a plurality of output jacks. A first pair of output jacks are switched outlet jacks and a second pair of output jacks are unswitched outlet jacks. A switching device is coupled to the plurality of outlet jacks to control which of the plurality of output jacks are the switched output jacks. Connectors are coupled to the switched outlet jacks for connecting remote controlled devices that control electronic devices coupled to the switched outlet jacks. Control circuitry is coupled to the switching device to monitor and limit a current through the switched outlet jacks, to monitor and limit a current through the switching device, and to interpret signals from remote controlled devices coupled to the connectors. Contacts are coupled to the control circuitry to couple the module to a switched electrical receptacle. A pair of touch switches are coupled to the connectors. The pair of touch sensors will allow one to control both switch output jacks.

17 Claims, 4 Drawing Sheets

SWITCHED OUTLET MODULE AND METHOD THEREFOR

BACKGROUND OF THE INVENTION

1. Field of the Invention

This invention relates to electrical power control, and more specifically, to the control of electrical devices, including lamps, by both standard wall switches and additional controls without the position of any wall switch or control preventing the others from operating.

2. Description of the Prior Art

To promote safety, the National Electrical Code Section 210-70(a) requires every room in a house or office to have lighting controlled by a wall switch. In most rooms, the wall switch can control one or more receptacle outlets to power floor, table, desk or other plug-in lamps. If a switch on a lamp is turned off, the wall switch can no longer turn on the lamp. This thwarts the intended safety of lighting a room before entering it. A table lamp on a night stand exemplifies the problem. Before going to sleep, the lamp is switched off. The next morning there is no impetus to turn the lamp switch back on. The next evening the wall switch can no longer turn on the lamp. Thus, one needs to walk in the dark towards the lamp and fumbling in the dark to locate the lamp switch to light the room.

Lamp switches are often found in inconvenient locations, such as under a lamp shade next to the base of a burning light bulb, on a lamp cord, or behind the lamp. Such switch locations require bending down, reaching underneath a lamp shade near a hot, bright light bulb, or reaching around behind a lamp or table to reach the lamp switch. Switches in these common locations are often difficult to locate and to operate. Even lamp switches on the base of a lamp are not always easy to reach and operate.

It would be desirable to provide one or more remote controls that allow the following: can be placed in easily accessible locations to replace the function of lamp switches, which cooperate with wall switches, provide additional functional features, and are easy to find and operate. Existing lamp switches can be left in the ON position, and can optionally have the switch knobs or handles removed or fixed in the ON position. The original lamp switches will most likely be ignored because the remote controls will be located in preferable locations, making them easier to use than the lamp switches. For example, a touch switch sitting on a night stand is easier to reach and operate.

To simplify installation and thereby reduce cost, it is desirable that the device plug into a standard wall outlet and the lamps or other electrical devices and an additional control or controls connect to the device. This avoids modifications to building wiring and the need for an electrician or any special tools to install it.

Therefore a need existed to provide an improved system and method for overcoming the above problem. The improved system and method will provide one or more remote controls that can be placed in easily accessible locations to replace the function of lamp switches, cooperate with existing wall switches, provide additional features, and are easy to find and operate.

SUMMARY OF THE INVENTION

In accordance with one embodiment of the present invention, it is an object of the present invention to provide a switched-outlet module and one or more remote controls.

It is another object of the present invention to provide a switched-outlet module and a remote control or controls that are highly portable and easily placed in accessible locations.

It is another object of the present invention to provide a switched-outlet module and one or more remote controls that are easy to install, remove, and reinstall.

It is yet another object of the present invention to provide a switched-outlet module and one or more remote controls that are easy to install and reinstall that do not require the user to have or use any special tools or technical training to install, remove, or reinstall.

It is still another object of the present invention to provide a switched-outlet module and one or more remote controls that are easy to install, remove, and reinstall that do not require the user to make any modifications to existing wiring to install, remove, or reinstall.

BRIEF DESCRIPTION OF THE PREFERRED EMBODIMENTS

In accordance with one embodiment of the present invention a switched outlet module which controls power to one or more electrically powered devices which are connected to the module and which are under the control of a wall switch is disclosed. The switched outlet module has a plurality of output jacks. A first pair of output jacks are switched outlet jacks and a second pair of output jacks are unswitched outlet jacks. A switching device is coupled to the plurality of outlet jacks to control which of the plurality of output jacks are the switched output jacks. Connectors are coupled to the switched outlet jacks for connecting remote controlled devices that control electronic devices coupled to the switched outlet jacks. Control circuitry is coupled to the switching device to monitor and limit a current through the switched outlet jacks, to monitor and limit a current through the switching device, and to interpret signals from remote controlled devices coupled to the connectors. Contacts are coupled to the control circuitry to couple the module to a switched electrical receptacle. A pair of touch switches are coupled to the connectors. The pair of touch sensors will allow one to control both switched output jacks.

The foregoing and other objects, features, and advantages of the invention will be apparent from the following, more particular, description of the preferred embodiments of the invention, as illustrated in the accompanying drawing.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings, wherein like reference numerals and symbols represent like elements.

DETAILED DESCRIPTION OF THE PREFERRED EMBODIMENT

Figure 1:
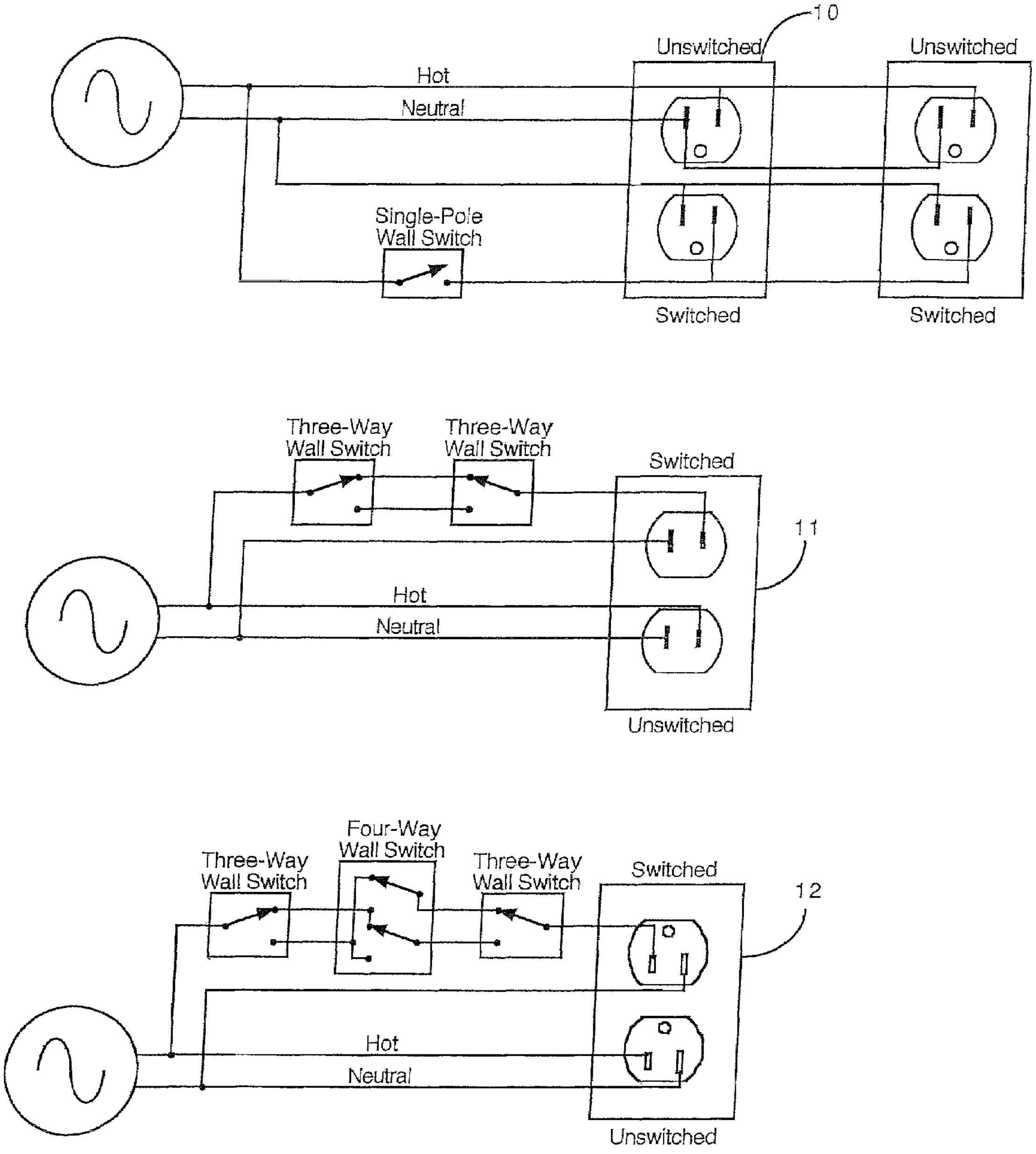
FIG. 1 shows simplified electrical block diagrams of various methods of wiring switched outlets for 1, 2, 3 or more wall switches.

Referring to FIG. 1, three electrical schematics depict a variety of ways two-circuit duplex receptacles can be wired to provide a switched outlet in a building. Outlet 10 shows a single-pole wall switch which controls power to the bottom outlet of a duplex receptacle. The bottom outlet is switched but it could be reversed as in 11 where the top outlet is switched. There is no standard to determine which outlet of a duplex receptacle is switched and which is not. The outlet 11 also has two 3-way switches coupled thereto to provide two wall switches, each of which can control the switched outlet 11. The circuit for the outlet 11 is used when a room has two doorways or entrances. Outlet 12 has wiring to provide three or more wall switches that can each control power to the switched outlet 12. Additional 4-way switches can be connected in series to provide four or more wall switches.

Outlet 10 also shows multiple switched outlets controlled by one wall switch. Outlet 11 also shows an ungrounded, polarized receptacle which is usually found in older buildings which do not have ground wiring. Outlet 12 shows a receptacle mounted upside-down compared to the receptacles in 10 and 11. There is no standard to determine which way a receptacle is mounted in an outlet box, so any orientation may be used. Hereinafter the orientation of outlet 10 will be used to indicate the top and bottom outlets of a two-circuit switched receptacle for the purposes of this patent.

The neutral wire is always connected to the wider slot on a receptacle and the hot wire to the narrower slot, as required by the National Electrical Code. Only the hot wire can be switched, the neutral wire must remain connected, not switched. On a two-circuit receptacle, the two neutral slots may or may not be connected to the same neutral wire. The unswitched outlet may be connected to a separate circuit from the switched outlet, so the switched-outlet module must not return current from the hot wire on one outlet to the neutral wire of the other outlet; or a ground-fault circuit interrupter (GFCI) may be triggered on either circuit as a result of the current imbalance it would create.

Figure 2:
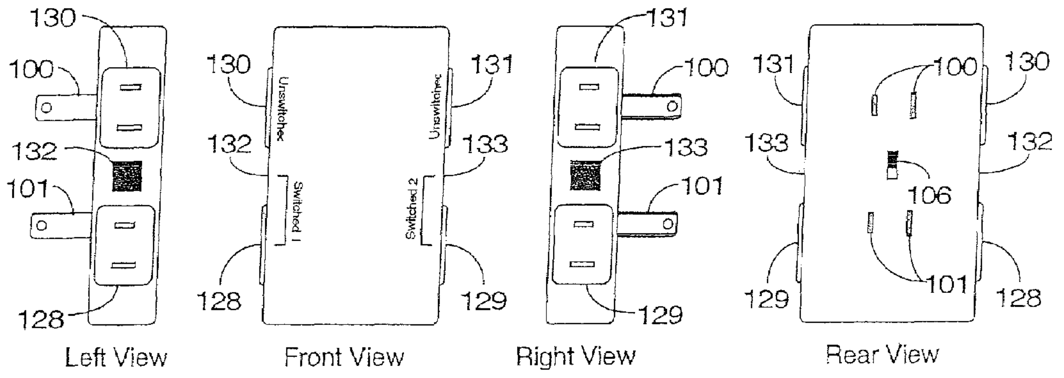
FIG. 2 shows different views of the switched outlet module of the present invention.
Figure 3:
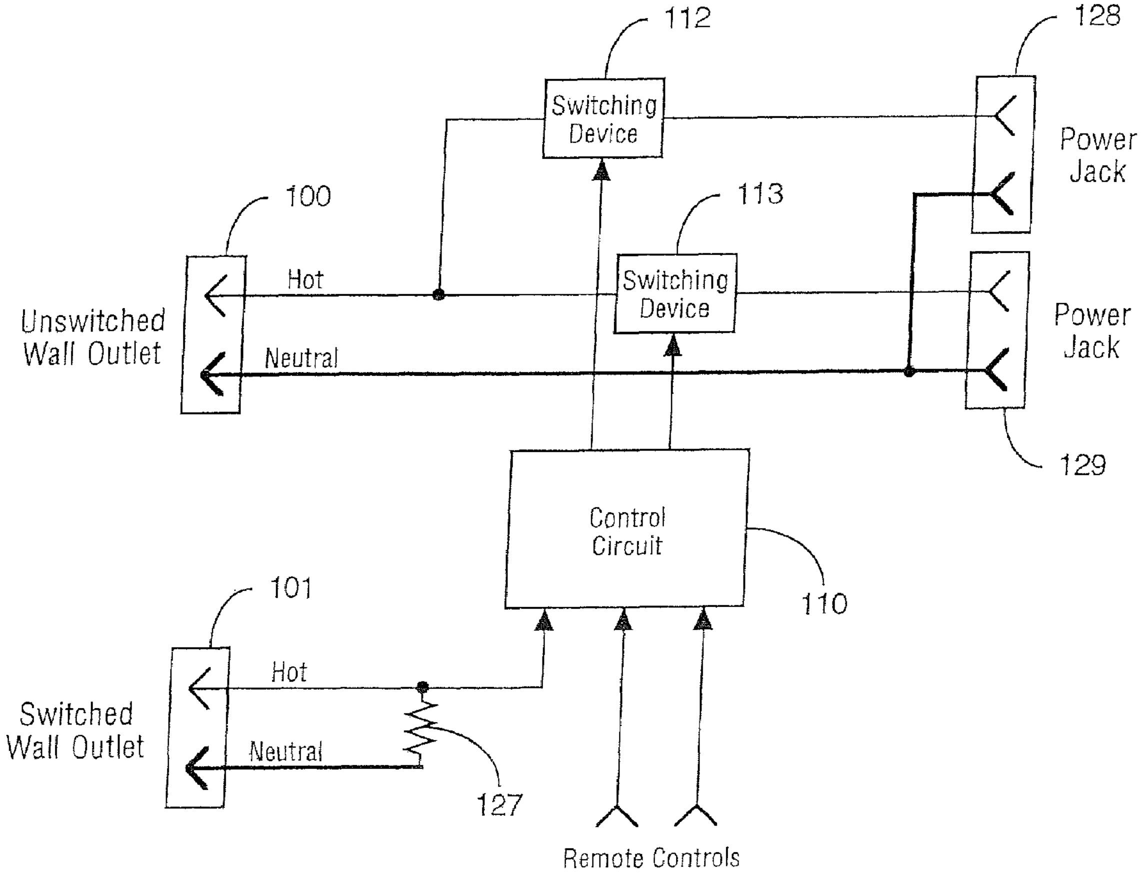
FIG. 3 shows a block diagram of the switched outlet module depicted in FIG. 2.
Figure 4:
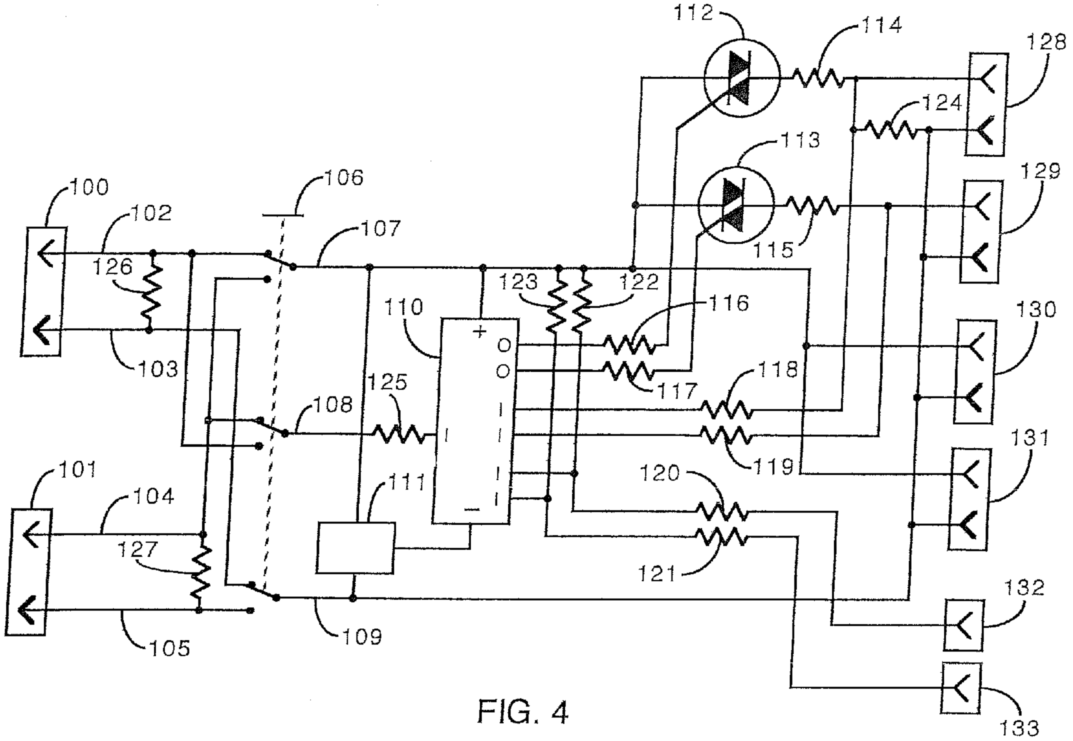
FIG. 4 shows an electrical schematic of the switched outlet module depicted in FIG. 2.
Figure 5:
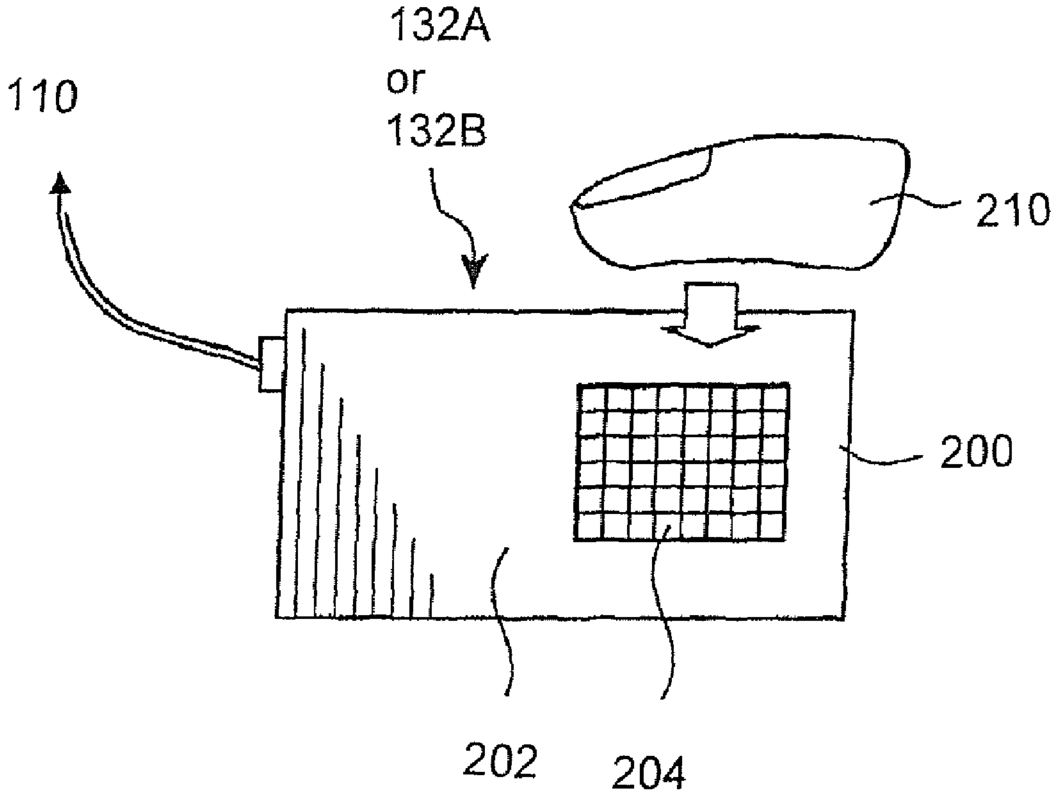
FIG. 5 is an elevated perspective view of the touch switches used in the present invention.

Referring to FIGS. 2, 3 and 4, wherein like numerals and symbols represent like elements, a switched outlet module 90 is shown. The switched outlet module 90 has male blades 100 and 101 that plug into a switched wall receptacle. Blade 100 is the top plug and blade 101 is the bottom plug. Elements 128 and 129 are the two switched jacks on the module that two controlled lamps or other electrical devices plug into. Jack 128 is the first switched jack and jack 129 is the second switched jack. Elements 130 and 131 are unswitched jacks. The unswitched jacks 130 and 131 will always supply AC power available to fulfill the “6-foot rule” which states that for every 6 feet of wall space there shall be at least one unswitched outlet.

Connectors 132 and 133 are inputs for wired remote controls which primarily control the first switched jack 128, and the second switched jack 129 respectively. Connectors 132 and 133 may be connected directly to different types of control mechanisms. For example, connectors 132 and 133 may be connected directly to mechanical or touch switches, interfaces to computer networks, standard busses, wireless receivers, and the like. It should be noted that the listing of the above should not be seen as to limit the scope of the present invention.

Slide or rocker switch 106 is a position switch which selects whether the unswitched outlet is on the top or bottom outlet of the wall receptacle. In the embodiment depicted in FIG. 4 the position switch 106 is a 3-pole, double-throw switch (3PDT). The first pole 107 of position switch 106, is set to connect to the unswitched hot wire 102 from the receptacle, which connects to the hot blade of plug 100 in the schematic. The second pole 108 of position switch 106 connects to the switched hot wire 104 through the bottom plug 101. This connects the switched hot wire from the receptacle through current limiting resistor 125 to an input pin on the microprocessor 110. This allows the microprocessor 110 to sense the state of the wall switch. The third pole 109 of position switch 106 selects the neutral wire 103 from the unswitched outlet. The neutral wire 105 from the bottom (switched) outlet cannot be used as a return because it could be connected to a separate circuit in the building which would contradict code and pose a safety hazard.

Resistors 126 and 127 provide a leakage shunt to ensure that the hot wires 102 and 104 respectively, whichever is connected to the switched outlet and whenever the wall switch is off or open, will provide a reliable signal through resistor 125 to the microprocessor 110.

The unswitched hot wire 107 and unswitched neutral wire 109 provide AC power to a power supply 111 which converts the power to a DC voltage appropriate to power the microprocessor 110. This may be any type of AC to DC power supply circuit including a charge pump.

Switching devices 112 and 113, which may be relays, contactors, solid state relays, or solid state devices include thyristors (triacs, silicon controlled rectifiers (SCRs), alternistors), transistors including junction field-effect transistors (JFETs), metal-oxide silicon field-effect transistors (MOSFETs) and insulated-gate bipolar transistors (IGBTs), switch the power to switched jacks 128 and 129 respectively. It should be noted that the listing of the different types of switching devices 112 and 113 are giving as examples and should not be seen as to limit the scope of the present invention.

Current limiting resistors 114 and 115 serve two functions. First, the voltage across each increases with the load current connected to switched jacks 128 and 129 respectively. These two voltages are current limited by resistors 118 and 119, respectively, and connected to two input pins on the microprocessor 110. This allows the microprocessor 110 to sense whenever too much current is being drawn through either switched jack 128 or 129, which indicates an overload condition. The microprocessor 110 can then take appropriate action to protect switching devices 112 and 113 from overheating and damage.

The second purpose of resistors 114 and 115 is to limit current through switching devices 112 and 113, respectively, during a light bulb burnout. Incandescent light bulb failure, when the tungsten filament breaks, can result in a tungsten arc which requires about 15 volts and 1 amp to maintain. The event is called flashover and is analogous to TIG (tungsten inert gas) welding. It can draw all of the current available from the power circuit. The arc is usually extinguished when the AC voltage crosses zero, cutting off the necessary current to fuel the arc. In the mean time of up to one half of a 60 Hz cycle, or about 8.33 milliseconds, a thyristor can be subjected to extremely high current. Resistors 114 and 115 are selected to limit this extreme current to a level that the switching devices 112 and 113 can survive for a half cycle without damage. Resistors 114 and 115 must also be able to survive the extreme current for the duration of the flashover. Without this protection the switched outlet module 90 could burnout as the result of a simple light bulb failure.

Resistors 116 and 117 limit current from the two microprocessor output pins that drive the gates of switching devices 112 and 113, respectively. The microprocessor 110 drives a thyristor gate low to turn each thyristor on. This, in turn, enables power to each of the switched jacks, 128 and 129.

Resistor pairs 120 and 122, 121 and 123 are voltage dividers to reduce the voltage from the remote controls 132 and 133, to two input pins on the microprocessor 110. The two microprocessor input pins sense when the remote controls are active to control the state of power jacks 128 and 129. It is completely up to the microprocessor 110 programming to interpret the remote control signals and act upon them. If the remote controls are touch sensors, the microprocessor 110 samples the remote control inputs near the positive peak of the unswitched hot wire, 107. A person contacting a touch sensor will apply a voltage near ground or neutral to the remote control input 132 or 133. This will cause a microprocessor input pin to go low, signaling the touch. The resistance of resistors 120 and 121 must be very high to limit the amount of current conducted to a person contacting a touch sensor.

Resistor 124 allows the microprocessor input pin connected through resistor 118 to detect AC zero-voltage crossing even if no load is connected to switched jack 128.

In accordance with one embodiment of the present invention, the connectors 132 and 133 are touch switches 132A and 132B. The touch switches 132A and 132B will allow one to control the lamps or other electrical devices that are plugged into the two switched jacks 128 and 129 on the module by touching the touch switches 132A and 132B with a finger 210 of the user. The microprocessor 110 is designed to allow the touch switches 132A and 132B to control both switched jacks 128 and 129.

The touch switches 132A and 132B will be comprised of a housing 200. The housing 200 is used to store a sensing circuit 204. The housing 200 further acts as a grounding plane for the touch switches 132A and 132B. A top panel 202 is placed over the housing 200. The top panel 202 will generally be a conductive material that when touched will make contact with a sensing element of the sensing circuit to complete the sensing circuit to allow the touch switches 132A and 132B to control both switched jacks 128 and 129.

The touch switches 132A and 132B are conductors to make contact with the users hand or body. The touch switches 132A and 132B may be made of metal, conductive plastic or other conductive materials.

As stated above, the microprocessor 110 is designed to allow the touch switches 132A and 132B to control both switched jacks 128 and 129. The microprocessor 110 is programmed so that when a user touches one of the touch switches 132A and 132B, a corresponding switched jack 128 and 129 will activate a lamp or other electrical devices (hereinafter lamp) that is plugged into the corresponding switched jacks 128 and 129. Thus, each touch switch 132A and 132B will initially control a corresponding switched jack 128 and 129. The touch switches 132A and 132B instruct the microprocessor 110 to dim or brighten the corresponding switched jack 128 or 129 so that the longer a person presses on the touch switches 132A and 132B, the brighter the lamp that is plugged into the corresponding switched jack 128 or 129 will become. If a person removes his hand from the touch switches 132A and 132B and then touches the corresponding touch switches 132A or 132B again, the lamp will begin to dim until the person removes his/her hand or the lamp is turned off. This allows the user to brighten or dim the lamp.

The touch switches 132A and 132B also allow cross control of the switched jacks 128 and 129. If a person keeps on pressing the corresponding touch switch 132A or 132B, once the lamp in the corresponding switched jack 128 or 129 has reached an extreme condition (i.e., brightest light output or off), the other switched jack 128 or 129 will begin brightening or fading. If one briefly releases the corresponding touch switch 132A or 132B and then releases the corresponding touch switch 132A or 132B and then touches the corresponding touch switch 132A or 132B again, a user can control the other lamp. Releasing the corresponding touch switch 132A or 132B longer and then touching the corresponding touch switch 132A or 132B again will allow the user to control the corresponding lamp again.

A user can then control both lamps on both switched jacks 128 or 129 with the same touch switch 132A or 132B. Once cross control of the other lamp is achieved and both lamps have reached the same extreme condition (either the brightest light output or the off condition) and the person continues to press on the touch switch 132A or 132B, both switched jacks 128 and 129 will begin to brighten or fade together and either touch switch 132A or 132B will control both switched jacks 128 and 129. This is called dual control.

A user can revert to control of the corresponding lamp only from dual control. If a person continues pressing on touch control 132A or 132B while in dual control, after both switched jacks 128 and 129 are both fully on or off, the switched jack 128 or 129 corresponding to the touch control 132A or 132B being pressed, will begin to fade or brighten, leaving the other switched jack 128 or 129 at the previous extreme condition. Either touch switch 132A or 132B will again control both the corresponding lamp in switched jacks 128 and 129.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A switched outlet module which controls power to one or more electrically powered devices which are connected to the module and which are under the control of a wall switch comprising:

- a plurality of outlet jacks wherein a first pair of outlet jacks are switched outlet jacks and a second pair of outlet jacks are unswitched outlet jacks;
- a switching device coupled to the plurality of outlet jacks to control which of the plurality of outlet jacks are the switched outlet jacks;
- connectors coupled to the switched outlet jacks for connecting remote controlled devices that control electronic devices coupled to the switched outlet jacks;
- control circuitry coupled to the switching device to monitor and limit a current through the switched outlet jacks, to monitor and limit a current through the switching device, and to interpret signals from remote controlled devices coupled to the connectors;
- contacts coupled to the control circuitry to couple the module to a switched electrical receptacle; and
- a pair of touch switches coupled to the connectors wherein a first touch switch controls a first device connected to a first switch outlet jack and a second touch switch controls a second device connected to a second switch outlet jack, wherein the control circuitry also performs cross control of the first and second device so continuously pressing the first touch switch causes the first device to approach one of an approximately maximum brightness level or an off position, once one of the approximately maximum brightness level or the off position of the first device is obtained, continuously pressing the first touch switch causes the second device to approach one of an approximately maximum brightness level or an off position, and continuously pressing the second touch switch causes the second device to approach one of an approximately maximum brightness level or an off position, once one of the approximately maximum brightness level or the off position is obtained by the second device, continuously pressing the second touch switch causes the first device to approach one of the maximum brightness level or the off position.

2. A switched outlet module in accordance with claim 1 wherein the contacts are two pairs of male blades for coupling the module to a switched duplex electrical receptacle.

3. A switched outlet module in accordance with claim 1 wherein the switching device is a 3-pole, double throw switch.

4. A switched outlet module in accordance with claim 1 wherein the control circuitry comprises:

a processor;

a power supply coupled to the processor to power the processor;

resistive elements coupled to the switching device to provide a reliable signal from the switched outlet to the processor;

voltage divider circuit coupled to the connectors and the processor for limiting a voltage signal from the connectors; and current limiting circuit coupled to the switching device to limit a current through the switching device.

5. A switched outlet module in accordance with claim 4 wherein the control circuitry further comprises a second switching device coupled to the switched outlet to switch power to the switched outlet.

6. A switched outlet module in accordance with claim 4 wherein the control circuitry further comprises a resistive element coupled to an input pin of the processor for allowing the processor to detect AC zero-voltage crossing.

7. A switched outlet module which controls power to one or more electrically powered devices which are connected to the module and which are under the control of a wall switch comprising:

outlet jacks wherein at least one outlet jack is a switched outlet jack and at least one outlet jack is an unswitched outlet jack;

a switching device coupled to the outlet jacks to control which receptacle of the switched electrical receptacle is the switched outlet receptacle connectors coupled to the switched outlet jack for connecting remote controlled devices that control devices coupled to the switched outlet jack;

control circuitry coupled to the switching device to monitor and limit a current through the switched outlet jack, to monitor and limit a current through the switching device, and to interpret signals from remote controlled devices coupled to the connectors wherein the control circuitry comprises:

a processor;

a power supply coupled to the processor to power the processor;

resistive elements coupled to the switching device to provide a reliable signal from the switched outlet to the processor;

voltage divider circuit coupled to the connectors and the processor for limiting a voltage signal from the connectors; and current limiting circuit coupled to the switching device to limit a current through the switching device;

contacts coupled to the control circuitry to couple the module to a switched electrical receptacle wherein the contacts are two pairs of male blades for coupling the module to a switched duplex electrical receptacle a pair of touch switches coupled to the connectors wherein a first touch switch controls a first device connected to a first switch outlet jack and a second touch switch controls a second device connected to a second switch outlet jack, wherein the control circuitry also performs cross control of the first and second device so continuously pressing the first touch switch causes the first device to approach one of an approximately maximum brightness level or an off position, once one of the approximately maximum brightness level or the off position of the first device is obtained, continuously pressing the first touch switch causes the second device to approach one of an approximately maximum brightness level or an off position, and continuously pressing the second touch switch causes the second device to approach one of an approximately maximum brightness level or an off position, once one of the approximately maximum brightness level or the off position is obtained by the second device, continuously pressing the second touch switch causes the first device to approach one of the maximum brightness level or the off position.

8. A switched outlet module in accordance with claim 7 wherein the switching device is a 3-pole, double throw switch.

9. A switched outlet module in accordance with claim 7 wherein the control circuitry further comprises a second switching device coupled to the switched outlet to switch power to the switched outlet.

10. A switched outlet module in accordance with claim 7 wherein the control circuitry further comprises a resistive element coupled an input pin of the processor for allowing the processor to detect AC zero-voltage crossing.

11. A switched outlet module which controls power to one or more electrically powered devices which are connected to the module and which are under the control of a wall switch comprising:

a plurality of outlet jacks wherein a first pair of outlet jacks are switched outlet jacks and a second pair of outlet jacks are unswitched outlet jacks;

switching means coupled to the plurality of outlet jacks to control which of the plurality of outlet jacks are the switched outlet jacks;

connectors coupled to the switched outlet jacks for connecting remote controlled devices that control electronic devices coupled to the switched outlet jacks;

means coupled to the switching means to monitor and limit a current through the switched outlet jacks, to monitor and limit a current through the switching device, and to interpret signals from remote controlled devices coupled to the connectors;

contacts coupled to the control circuitry to couple the module to a switched electrical receptacle; and a pair of touch switches coupled to the connectors wherein a first touch switch controls a first device connected to a first switch outlet jack and a second touch switch controls a second device connected to a second switch outlet jack, wherein the control circuitry also performs cross control of the first and second device so releasing the first touch switch for a first predetermined amount of time and retouching the first touch switch again allows the first touch switch to control the second device and releasing the first touch switch for a second predetermined amount of time and retouching the first touch switch again allows the first touch switch to control the first device again.

12. A switched outlet module in accordance with claim 11 wherein the contacts are two pairs of male blades for coupling the module to a switched duplex electrical receptacle.

13. A switched outlet module in accordance with claim 11 wherein the switching device is a 3-pole, double throw switch.

14. A switched outlet module in accordance with claim 11 wherein the control circuitry comprises:

a processor a power supply coupled to the processor to power the processor;

resistive elements coupled to the switching device to provide a reliable signal from the switched outlet to the processor;

voltage divider circuit coupled to the connectors and the processor for limiting a voltage signal from the connectors;

current limiting circuit coupled to the switching device to limit a current through the switching device;

a second switching device coupled to the switched outlet to switch power to the switched outlet; and a resistive element coupled an input pin of the processor for allowing the processor to detect AC zero-voltage crossing.

15. The switched outlet module of claim 11 wherein the control circuitry performs additional cross control of the first and second device so releasing the second touch switch for a first predetermined amount of time and retouching the second touch switch again allows the second touch switch to control the first device and releasing the second touch switch for a second predetermined amount of time and retouching the second touch switch again allows the second touch switch to control the second device again.

16. The switched outlet module of claim 15 wherein the control circuitry performs additional cross control of the first and second device so continuously pressing the first touch switch causes the first device to approach one of an approximately maximum brightness level or an off position, once one of the approximately maximum brightness level or the off position of the first device is obtained, continuously pressing the first touch switch causes the second device to approach one of an approximately maximum brightness level or an off position, and continuously pressing the second touch switch causes the second device to approach one of an approximately maximum brightness level or an off position, once one of the approximately maximum brightness level or the off position is obtained by the second device, continuously pressing the second touch switch causes the first device to approach one of the maximum brightness level or the off position.

17. The switched outlet module of claim 11 wherein the control circuitry performs additional cross control of the first and second device so continuously pressing the first touch switch causes the first device to approach one of an approximately maximum brightness level or an off position, once one of the approximately maximum brightness level or the off position of the first device is obtained, continuously pressing the first touch switch causes the second device to approach one of an approximately maximum brightness level or an off position, and continuously pressing the second touch switch causes the second device to approach one of an approximately maximum brightness level or an off position, once one of the approximately maximum brightness level or the off position is obtained by the second device, continuously pressing the second touch switch causes the first device to approach one of the maximum brightness level or the off position.

* * * * *